United States Patent [19]

Kitagawa et al.

[11] 4,448,275

[45] May 15, 1984

[54] TORQUE SENSOR

[75] Inventors: Junji Kitagawa; Shigeyuki Akita, both of Okazaki; Norimichi Kasegawa, Susono; Akira Nakamura, Shizuoka, all of Japan

[73] Assignees: Nippon Soken, Inc., Nishio; Toyota Jidosha Kogyo Kabushiki Kaisha, Toyota, both of Japan

[21] Appl. No.: 325,484

[22] Filed: Nov. 27, 1981

[30] Foreign Application Priority Data

Nov. 28, 1980 [JP] Japan .................................. 55-168709
Dec. 26, 1980 [JP] Japan .................................. 55-186270

[51] Int. Cl.³ .............................................. B62D 5/04
[52] U.S. Cl. .................................. 180/79.1; 73/862.33; 180/142
[58] Field of Search ..................... 180/79.1, 141, 142, 180/78, 79; 73/862.33, 862.34

[56] References Cited

U.S. PATENT DOCUMENTS 3,041,874 7/1962 Saxl ................................. 73/862.33
4,173,265 11/1979 Kremer ............................ 73/862.33

FOREIGN PATENT DOCUMENTS 790692 2/1958 United Kingdom ............. 73/862.33
871357 6/1961 United Kingdom ............. 73/862.33

Primary Examiner—Joseph F. Peters, Jr.
Assistant Examiner—Donn McGiehan
Attorney, Agent, or Firm—Cushman, Darby & Cushman

[57] ABSTRACT

A torque sensor generates an electric signal representing a change in the state of electromagnetic or electrostatic coupling between first and second rotors coupled together by a torsion spring. The change is caused with relative rotation of the two rotors caused by detected torque in a power assisted steering system of an automotive vehicle.

6 Claims, 18 Drawing Figures

TORQUE SENSOR

BACKGROUND OF THE INVENTION

This invention relates to torque sensors and, more particularly, to a torque detector for a motor for providing assisting torque to a vehicle steering shaft.

A method of detecting torque with a semiconductor strain gauge mounted on a steering main shaft has been contemplated. In this method, however, the output characteristics are subject to fluctuations with vibrations of the semiconductor strain gauge or in long use. Also, problems are found in the symmetricity of output characteristics with respect to the same torques exerted on the opposite sides.

SUMMARY OF THE INVENTION

An object of the invention is to provide a torque sensor, which detect torque through conversion of the relative rotation of first and second rotors rotated relative to each other via a torsion bar by the detected torque converted into a corresponding electric signal.

Another object of the invention is to provide a torque sensor, which comprises a first rotor having a first coil supplied with a pulse voltage signal, and a second rotor having a second coil perpendicularly facing the first coil at a predetermined distance therefrom, the second rotor being coupled to the first rotor electrically by inductance coupling and mechanically by a torsion spring, the positional relation between the first and second coils being caused due to a twist or displacement between the first and second rotors to change the magnitude and direction of the magnetic flux crossing the seoond coil, the change being detected as a change in voltage and phase of a pulse voltage signal produced across the second coil, thereby detecting the magnitude and direction of torque exerted to a torsion spring causing the twist or displacement of the second coil with respect to the first coil.

A further object of the invention is to provide a torque sensor, which comprises a first rotor having two kinds of first electrodes supplied with respective signals of opposite phases, and a second rotor having a second electrode facing the two kinds of first electrodes and coupled thereto electrically by electrostatic capacitance coupling and mechanically by a torsion spring, the area of overlap of each of the two first electrode and the second electrode being changed with a twist or displacement caused between the first and second rotors to cause great changes in the electrostatic capacitances of the individual electrode pairs, the change being detected as a change of the voltage signal from the second electrode, thereby detecting the magnitude and direction of the torque exerted to a torsion spring causing the twist or displacement of the second electrode with respect to the two kinds of first electrodes.

Use of comb-shaped electrodes as the first and second electrodes is effective for increasing the precision of detection for small angles.

DESCRIPTION OF THE PREFERRED EMBODIMENTS

Figure 1:
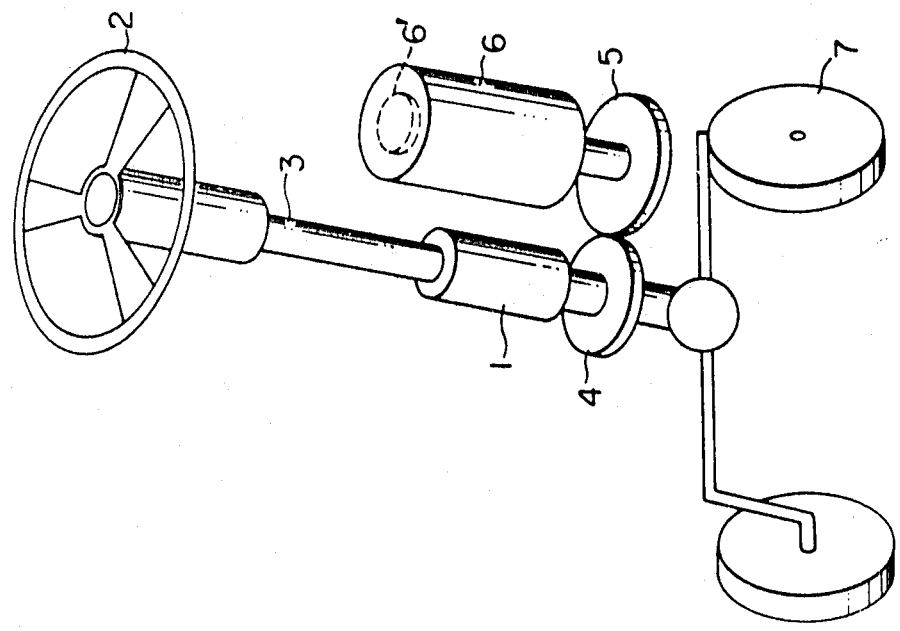
FIG. 1 is a schematic view showing a construction including a torque sensor embodying the invention.

Now, an embodiment of the invention will be described with reference to the accompanying drawings. Referring now to FIG. 1, which outlines the entirety of the torque sensor according to the invention, a torque sensor 1 includes an electric circuit for detecting torque generated in a steering main shaft and generates a pulse duration signal proportional to the detected torque. Designated at 2 is a steering wheel, at 3 the sterring main shaft, and at 4 and 5 gears meshing with each other. Torque assisting motor means 6 supplies motor torque proportional to the detected torque represented by the signal from the torque sensor 1 through the gears 4 and 5 to the main shaft 3. Designated at 7 are tires. The motor means 6 may include a motor drive circuit 6' for converting the output signal from the sensor 1 into a motor control signal.

The motor drive circuit 6' may be arranged such that when the torque sensor 1 detects drive torque with the main shaft 3 driven in the clockwise direction, for instance, the motor 6 is driven to drive the tyres in the rightward direction. On the other hand, when drive torque is detected with the main shaft driven by the steering wheel in the counterclockwise direction, the motor 6 is driven in the opposite direction to assist the driving of the tyres in the leftward direction.

Figure 2:
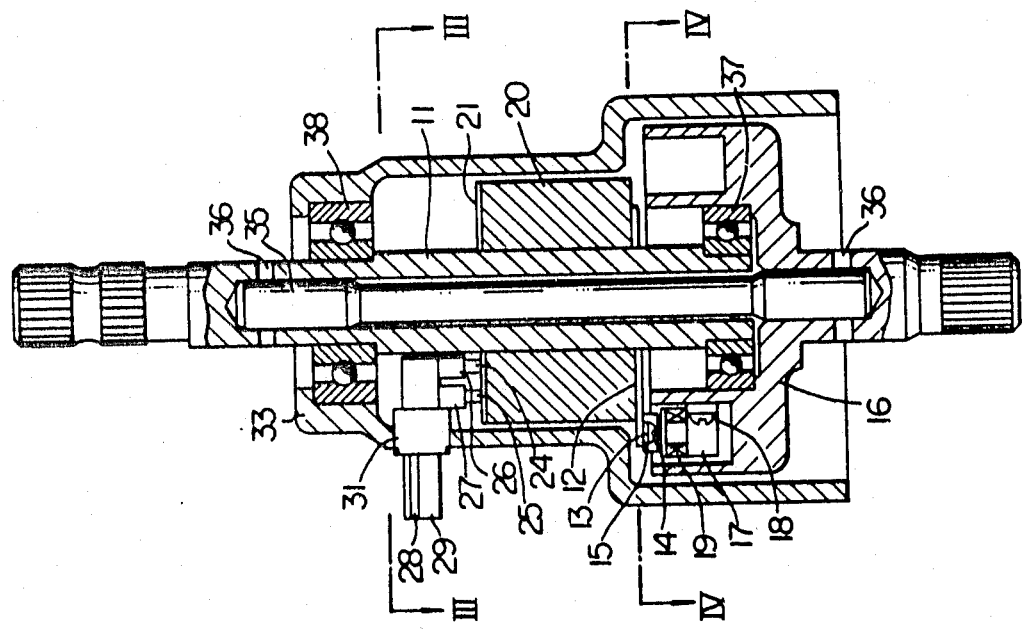
FIG. 2 is a fragmentary sectional view showing the mechanical part of a first embodiment of the torque sensor according to the invention.

FIG. 2 shows a fragmentary sectional view of the details of the internal construction of the torque sensor 1 shown in FIG. 2. A first rotor 11 is secured by a screw to a stay 12. A first bobbin 13 is secured by a screw 14 to the stay 12. A first coil 15 is wound on the first bobbin 13. A second rotor 16 is secured by a screw 18 to a second bobbin 17 containing ferrite (not shown). A second coil 19 is wound on the second bobbin 17.

An electric circuit section 20 and a plate 21 having two slip rings to be described later in detail are bonded by an epoxy adhesive to the first rotor 11. Brushes 24 and 25 are urged against the slip rings of the plate 21 by brush holders 26 and 27 comprising spring members so that they are electrically connected to the slip rings even when the first rotor 11 is rotating, and they are secured by screws to be described later to connector pins 28 and 29. The connector pins 28 and 29 are bonded by epoxy resin to a connector holder 31. The connector holder 31 has a holder cover to be described later, which is secured by a screw to a housing 33 to be described later.

A torsion bar spring 35 is pressure fitted in the first and second rotors 11 and 16 and secured thereto by two knock pins 36. The first and second rotors 11 and 16 are coupled together via a bearing 37. The first rotor 11 and housing 33 are coupled together via a bearing 38. The first and second rotors 11 and 16 which are coupled together by the torsion spring 35, can thus be smoothly rotated with respect to the housing 33.

Figure 3:
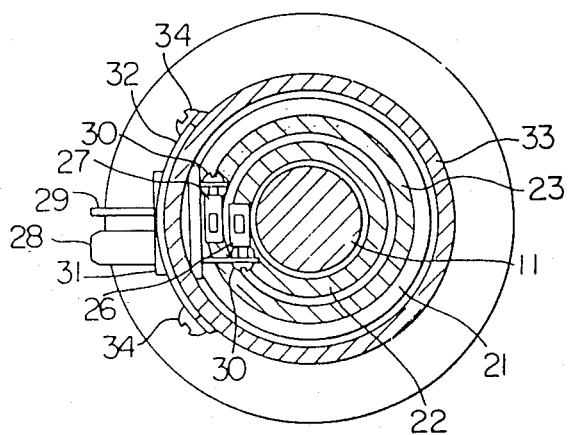
FIGS. 3 and 4 are sectional views taken along lines III—III and IV—IV in FIG. 2.

FIG. 3 is a section of the torque sensor 1 taken along line III—III in FIG. 2. In the Figure, designated at 33 is the housing, at 11 the first rotor, and at 21 the plate, all these parts being as mentioned before. Designated at 22 and 23 are ring-like slip rings. The brush holders 26 and 27 are secured by screws 30 to the respective connector pins 28 and 29. A holder cover 32 of the connector holder 31 is secured by a screw 34 to the housing 33.

Figure 4:
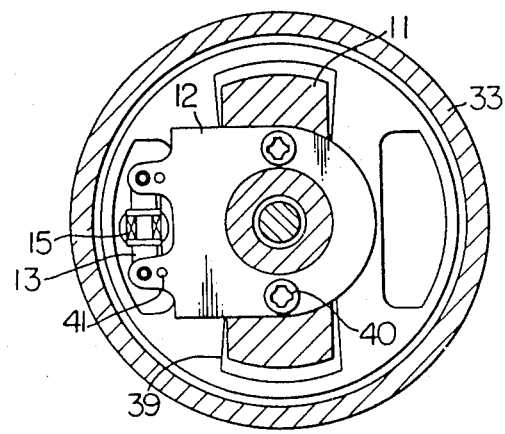

FIG. 4 is a sectional view of the torque sensor taken along line IV—IV in FIG. 2. The stay a plate 12 is secured by screws 40 to the first rotor 11, and is formed with holes 41, through which lead wires from the second coil 19 shown in FIG. 2 are led to the electric circuit 20. Designated at 13 is the first bobbin as mentioned, and at 15 the first coil as mentioned. The first rotor 11 is provided with a stopper 39 for preventing the displacement of the first and second rotors 11 and 16 relative to each other beyond a predetermined angle.

Figure 6:
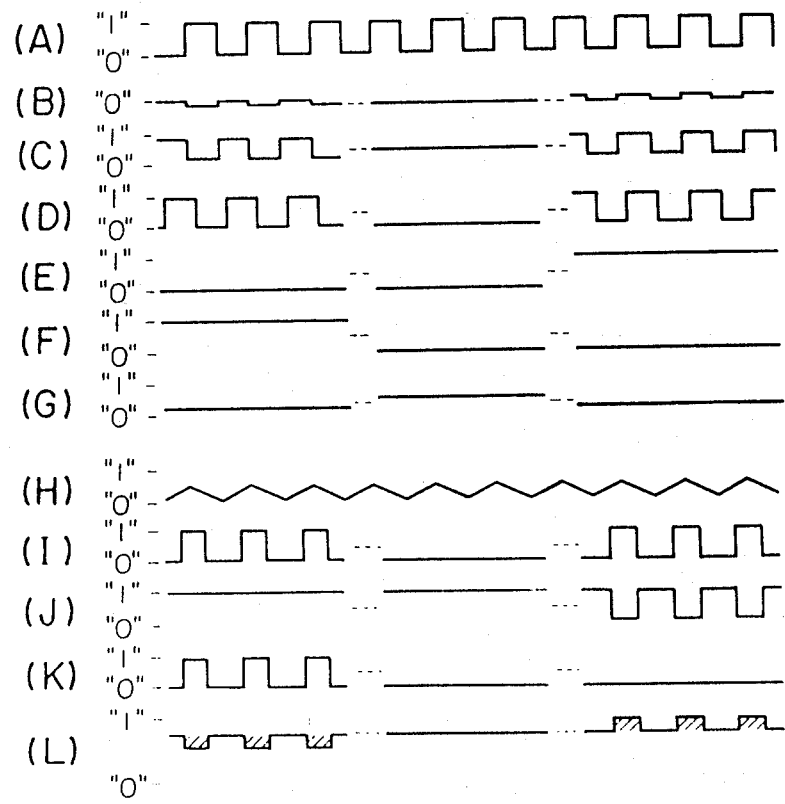
FIG. 6 is a waveform chart showing voltage waveforms appearing at various parts of the circuit of FIG. 5.
Figure 5:
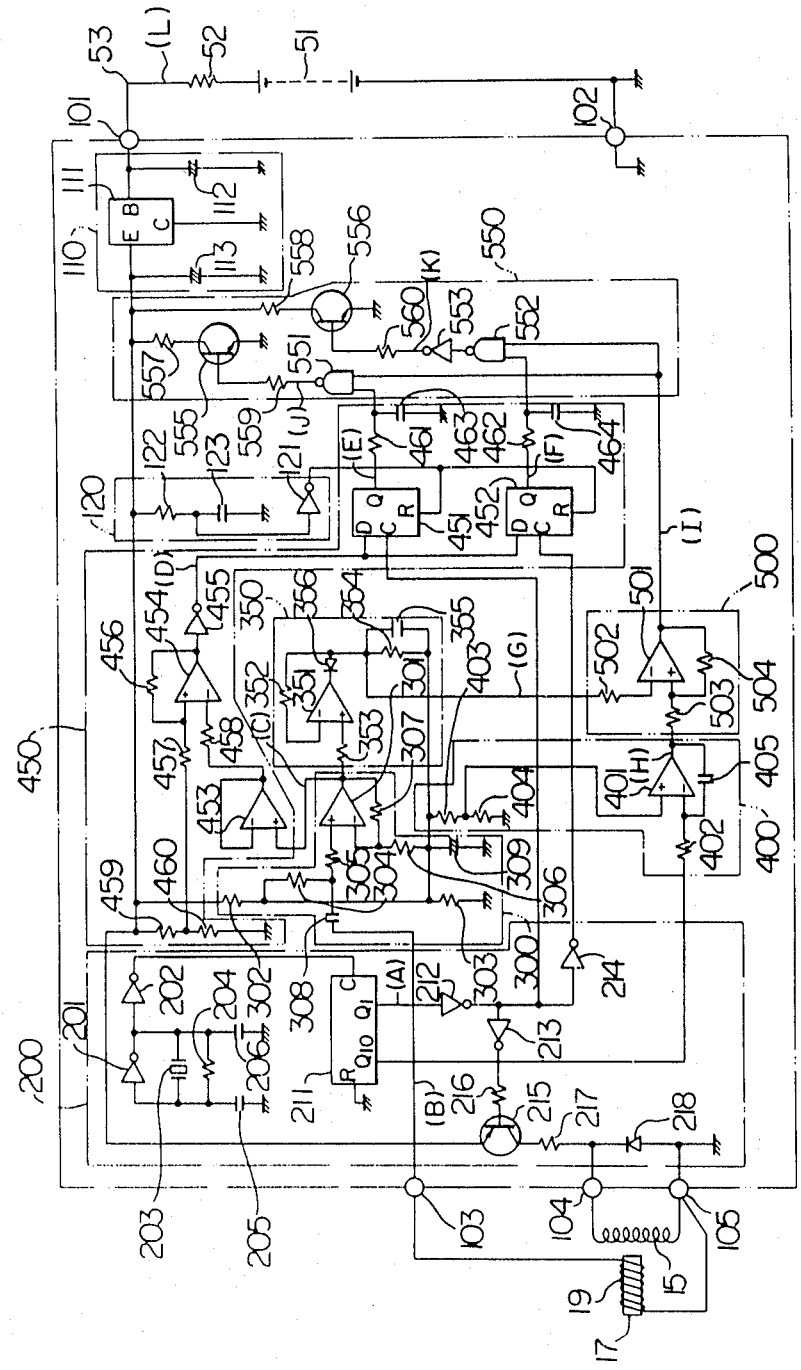
FIG. 5 is a schematic showing an example of the electric circuit used for the embodiment of FIG. 2.

FIG. 5 is an electric circuit diagram showing the electric circuitry of one embodiment of the torque sensor according to the invention, and FIG. 6 is a waveform chart showing voltage waveforms appearing at various parts of the circuitry. Referring to FIG. 5, shown at 51 is a battery for supplying power to the electric circuit 20. In series with the battery 51 is a current detection resistor 52. A power supply terminal 101 is connected through the slip ring 23, brush 25, brush holder 27 and connector pin 29 shown in FIG. 3 to the resistor 52. A terminal 102 is connected through the slip ring 22, brush 24, brush holder 26 and connector pin 28 shown in FIG. 3 to the grounded terminal of the battery 51. A terminal 103 is connected to one end of the second coil 19 wound on the second bobbin 17 shown in FIG. 2. The other end of the second coil 19 is connected to a terminal 105. A terminal 104 is connected to one end of the first coil 15 wound on the first bobbin shown in FIG. 4. The other end of the first coil 15 is connected to the terminal 105.

A constant voltage circuit 110, which includes a regulator 111 (which may be "MC7806" produced by Motorola INC. in U.S.A.) and capacitors 112 and 113, always provides a constant output voltage. An initializing circuit 120, which includes an inverter 121, a resistor 122 and a capacitor 123, generates a "1" level signal at the moment when power is supplied.

An oscillator 200, which includes an oscillating circuit having inverters 201 and 202, a ceramic oscillator 203, a resistor 204 and capacitors 205 and 206 as well as a binary counter 211 (which may be "TC4020" produced by Toshiba CORP.), inverters 212, 213 and 214, a transistor 215, resistors 216 and 217 and a diode 218, generates a rectangular wave which is supplied via the terminal 104 to the first coil 15.

An amplifier 300, which includes an operational amplifier 301, resistors 302, 303, 304, 305, 306 and 307 and capacitors 308 and 309, amplifies a signal produced from the second coil 19. A peak hold circuit 350, which includes an operational amplifier 351, resistors 352, 353 and 354, a capacitor 355 and a diode 356, holds the negative peak voltage of the output signal from the amplifier 300.

A triangle wave generator 400, which includes an operational amplifier 401, resistors 402, 403 and 404 and a capacitor 405, generates a triangular wave. A left/right discriminating circuit 450, which includes D-type flip-flops 451 and 452 (which may be "TC4013" produced by Toshiba CORP.), operational amplifiers 453 and 454, an inverter 455, resistors 456, 457, 458, 459, 460, 461 and 462 and capacitors 463 and 464, discriminates either lefward or rightward displacement of the second coil 19 with respect to the first coil 15.

A pulse duration converting circuit 500, which includes an operational amplifier 501 and resistors 502, 503 and 504, generates a pulse duration signal proportional to a voltage generated in the peak hold circuit 350.

A current value converting circuit 550, which includes NAND gates 551 and 552, an inverter 553, transistors 555 and 556 and resistors 557, 558, 559 and 560, converts the signals produced from the left/right discriminating circuit 450 and pulse duration converting circuit 500 into corresponding current value changes. More particularly, this circuit transmits information about the extent of leftward or rightward displacement of the second coil 19 with respect to the first coil 15, in the form of current value changes, to the power supply terminal 101. This information is detected as voltage changes at one end 53 of the resistor 52.

The operation of the construction described above will now be described. A pulse signal generated from the inverter 202 of the oscillator 200 is fed to the C (clock) terminal of the binary counter 211. The counter 211 is generating a pulse signal as shown in (A) of FIG. 6 from its first stage output terminal $Q_1$. This pulse signal is coupled through the inverters 212 and 213 to the transistor 215 to drive this transistor. The output of the transistor is coupled through the terminal 104 to the first coil 15.

Figure 7A:
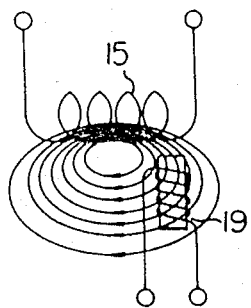
FIGS. 7A to 7C are schematic views showing respective status of the first and second coils for illustrating the operation of the first embodiment.

If the second coil 19 is displaced in the rightward direction with respect to the first coil 15 as shown in FIG. 7A due to a rightward twist between the first and second rotors 11 and 16 shown in FIG. 2 caused by a certain angle via the torsion spring 35, of the magnetic flux generated by the first coil 15 that which crosses the second coil 19 is increased. As a result, a voltage signal corresponding to the angle of twist as shown in (B) of FIG. 6 is generated in the coil 15 and supplied to the capacitor 308 of the amplifier 300. A reference voltage from a voltage divider constituted by the resistors 302 and 303 is applied through the resistors 304 to the other end of the capacitor 308 and is coupled to the non-inverting input terminal of the operational amplifier 301. Since the voltage from the voltage divider consisting of the resistors 302 and 303 is fed to its inverting input terminal, the input signal to the capacitor 308, as shown in (B) of FIG. 6, is amplified by the operational amplifier 301. The output of the operational amplifier 301 is shown in (C) of FIG. 6.

This amplified signal in (C) of FIG. 6 is coupled to the non-inverting input terminal of the operational amplifier 453 of the left/right discriminating circuit 450 for impedance conversion. The output of the operational amplifier 453 is coupled through the resistor 458 to the inverting input terminal of the operational amplifier 454 for comparison with the voltage from the voltage divider consisting of the resistors 459 and 460. Due to a response delay in the operational amplifier 454, the output signal is a pulse signal slightly delayed behind the input signal, and a signal as shown in (D) of FIG. 6 appears from the inverter 455 and enters the D (data) terminals of the D-type filp-flops 451 and 452.

Meanwhile, the pulse signal shown in (A) of FIG. 6 and an opposite phase pulse signal thereto are respectively supplied to the C (clock) terminals of the D-type flip-flops 452 and 451. Thus, the D-type flip-flops 451 and 452 provide respective "0" and "1" level signals as shown in (E) and (F) of FIG. 6 from their Q output terminals.

The amplified output in (C) of FIG. 6 is also coupled to the non-inverting input terminal of the operational amplifier 351 of the peak hold circuit 350. Since the negative peak voltage of the amplified signal is lower than the reference voltage from the voltage divider of the resistors 302 and 303, the negative peak voltage of the amplified signal, as shown in (G) of FIG. 6, is provided as the hold output.

A pulse signal appearing from the 10-th output terminal $Q_{10}$ of the binary counter 211 of the oscillator 200 is coupled through the resistor 402 of the triangular wave generator 400 to the inverting input terminal of the operational amplifier 401. Due to the time constant of the circuit consisting of the resistor 402 and capacitor 405, a triangular wave as shown in (H) of FIG. 6, is generated from the operational amplifier 401. This output is coupled to the non-inverting input terminal of the operational amplifier 501 in the pulse duration converting circuit 500 for voltage comparison with a signal coupled to the inverting input terminal as shown in (G) of FIG. 6. Thus a signal as shown in (I) of FIG. 6 is generated from the operational amplifier 501. This signal of (I) in FIG. 6 and also the signals of (E) and (F) in FIG. 6 are coupled to the current value converting circuit 550. The NAND gate 551 thus provides a "1" level signal as shown in (J) of FIG. 6 to turn on the transistor 555, thus causing current through the resistor 557. The inverter 553 provides an output signal as shown in (K) of FIG. 6 to on-off operate the transistor 556. Thus, necessary current is supplied from the battery 51 through the constant voltage circuit 110, whereby a pulse duration signal corresponding to the angle of twist of the torsion spring 35 is generated in the direction from a constant voltage level toward "0" level as shown in (L) of FIG. 6 at the end 53 of the current detecting resistor 52.

Figure 7B:
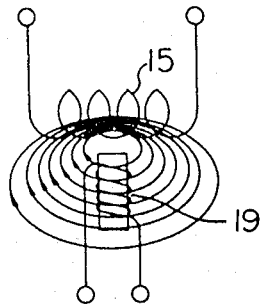

If the twist between the first and second rotors 11 and 16 in FIG. 2 via the torsion spring 35 becomes zero, the second coil 19 is brought to the center of the first coil 15 as shown in FIG. 7B. In this state, the magnetic flux generated by the first coil 15 includes no component vertically crossing the second coil 19. Thus, the voltage across the second coil 19 is reduced to "0" level as shown in the middle portion of (B) in FIG. 6.

Thus, the output of the amplifier 300 becomes equal to the reference voltage of the voltage divider consisting of the resistors 302 and 303 as shown in (C) of FIG. 6. With this voltage coupled to the left/right discriminating circuit 450 and hold circuit 350, the output of the inverter 455 of the left/right discriminating circuit 450 is rendered to be "0" level as shown in (D) of FIG. 6. As a result, the D-type flip-flops 451 and 452 provide output of "0" level from their output terminals Q as shown in (E) and (F) of FIG. 6. Also, the output voltage of the peak hold circuit 350 becomes equal to the reference voltage of the voltage divider of the resistors 302 and 303 as shown in (G) of FIG. 6. The pulse duration converting circuit 500 thus provides an output of "0" level as shown in (I) of FIG. 6 to the current value converting circuit 550. Since the inputs to the NAND gates 551 and 552 are all at "0" level at this time, the output of the NAND gate 551 is thus rendered to be at "1" level as shown in (J) of FIG. 6, thus triggering the transistor 555. Also, the output of the inverter 553 is rendered to be at "0" level as shown in (K) of FIG. 6, thus cutting off the transistor 556. Thus, a constant voltage as shown in (L) of FIG. 6 is generated at the end 53 of the current detecting resistor 52, indicating that there is no twist in the torsion spring.

Figure 7C:
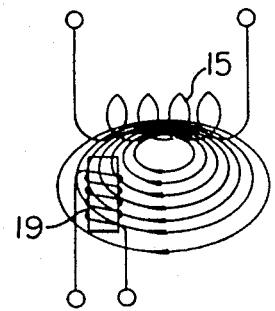

If the second coil 19 is leftwardly displaced with respect to the first coil 15 as shown in (C) of FIG. 7 due to a leftward twist between the first and second rotors 11 and 16 shown in FIG. 2 by a certain angle via the torsion spring 35, portion of the magnetic flux generated by the first coil 15 that crosses the second coil 19 is increased. Since at this time the direction of the magnetic flux crossing the second coil 19 is opposite to that in the case of the rightward displacement. Thus, a signal of the opposite phase to that in case of the rightward twist between the first and seoond rotors 11 and 16 caused by the torsion spring 35 is generated in the coil 19 as shown in (B) of FIG. 6 (in the right hand end portion thereof). It will thus be seen that the same operation as in the case of the aforementioned rightward twist except that the phase is opposite takes place (this being not described in detail). At this time, a pulse duration signal corresponding to the angle of twist of the torsion spring 35 is generated in the direction from the constant voltage level toward "1" level as shown in (L) of FIG. 6 at the end 53 of the current detecting resistor 52.

While in the above embodiment the two rotors have been electromagnetically coupled together, it is also possible to use two rotors which are electrostatically coupled together.

Figure 8:
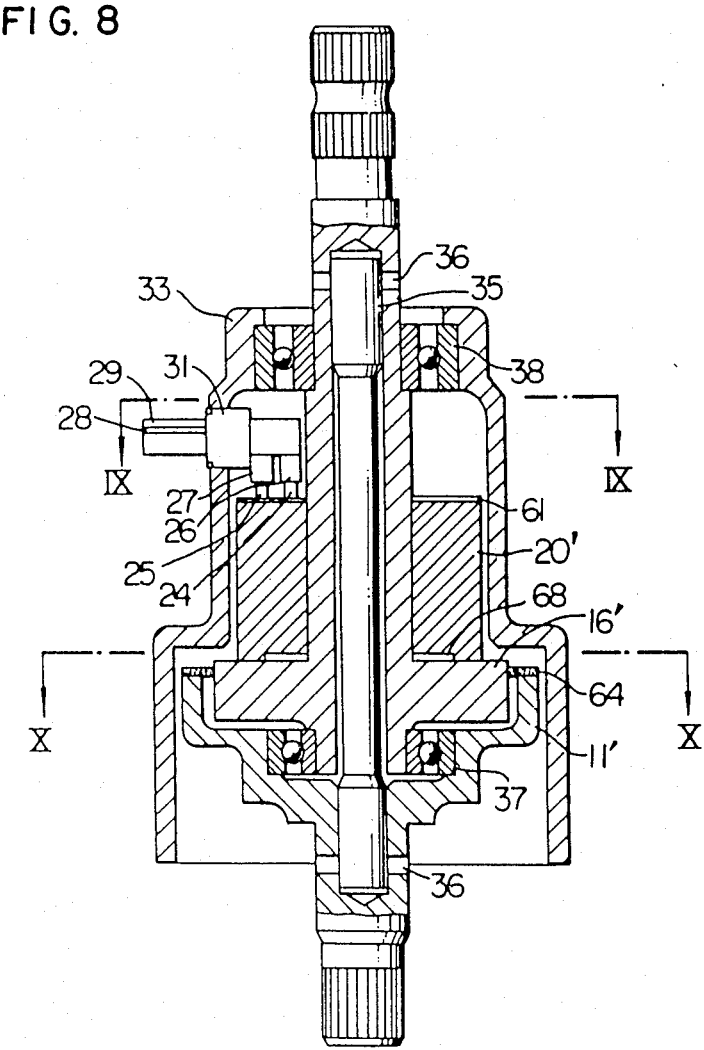
FIG. 8 is a schematic view showing a second embodiment of the invention.

FIGS. 8 to 14C show a second embodiment of the invention, which incorporates two rotors electrostatically coupled together. In the Figures, like parts or corresponding parts to as those in the first embodiment are designated by like reference numerals. FIG. 8 is a fragmentary sectional view showing the internal construction of the second embodiment of the torque sensor 1. Designated at 11' is the first rotor, to which a plate 64 having two kinds of first electrodes are secured by screws as will be described hereinafter. Designated at 16' is the second rotor, to which a second plate 68 having second electrodes are secured by screws as will be described hereinafter.

An electric circuit section 20' and a third plate having two ring-like slip rings to be described later are bonded by an epoxy resin to the second rotor 16'. Brushes 24 and 25 are urged against the slip rings of the third plate 61 by brush holders 26 and 27 comprising spring members so that they are electrically connected to the slip rings even when the second rotor 16' is rotating, and they are secured by screws to be described later to connector pins 28 and 29. The connector pins 28 and 29 are bonded by an epoxy resin to the connector holder 31. The connector holder 31 has a holder cover to be described later, which is secured by a screw to a housing 33 to be described later.

A torsion spring 35 is pressure fitted in the first and second rotors 11' and 16' and secured thereto by the two knock pins 36. The first and second rotors 11' and 16' are coupled together via a bearing 37. The second rotor 16' and housing 33 are coupled together via the bearing 38. The first and second rotors 11' and 16' which are coupled together by the torsion spring 35, can thus be smoothly rotated with respect to the housing 33.

Figure 9:
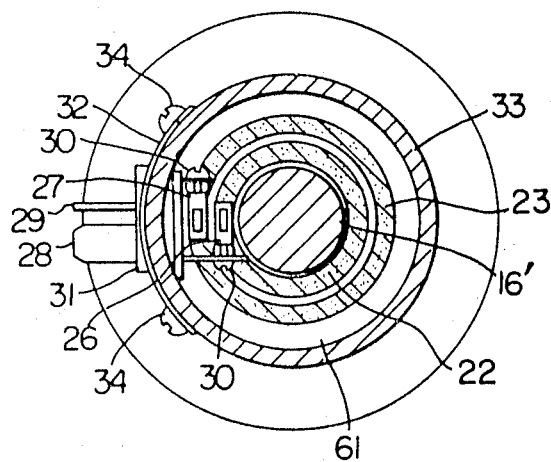
FIGS. 9 and 10 are sectional views taken along lines IX—IX and X—X in FIG. 8.

FIG. 9 is a section of the torque sensor 1 taken along line IX—IX in FIG. 8. The illustrated construction shown in FIG. 9 is approximately the same as that of FIG. 3 except that the second rotor 16' instead of the first rotor 11 in FIG. 3 is shown with the third plate 61.

Figure 10:
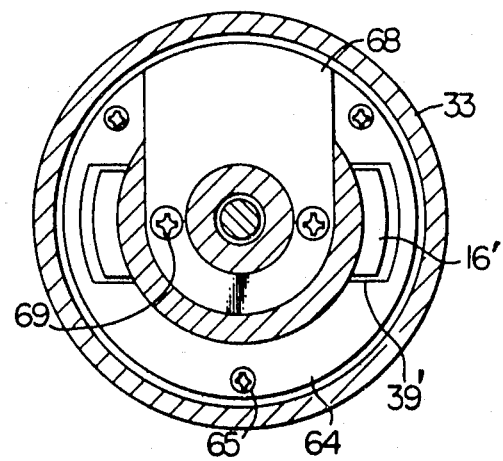
Figure 11:
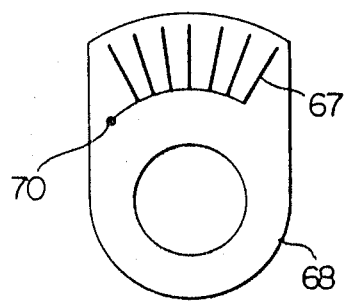
FIGS. 11 and 12 are plan views showing a specific example of the first and second plates in the second embodiment of the invention.
Figure 12:
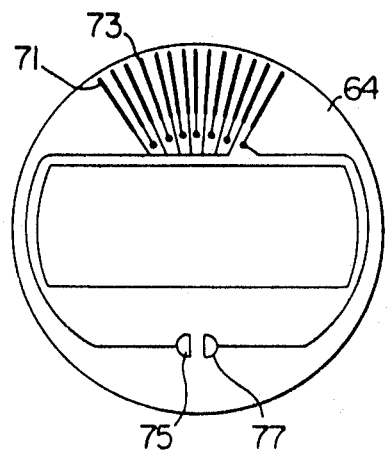

FIG. 10 is a sectional view of the torque sensor taken along line X—X in FIG. 8. In the Figure, designated at 16' is the second rotor, to which the second plate 68 is secured by the screw 69. Designated at 64 is the first plate as mentioned above, which is secured by the screw 65 to the first rotor. A portion 39 of the second rotor 16' serves as a stopper for preventing the displacement of the first and second rotors relative to each other beyond a predetermined angle. FIG. 11 is a plan view showing the second plate 68 shown in FIG. 8. It has a second electrode 67 having a portion 70 connected to the electric circuit 20' mentioned above. FIG. 12 is a plan view showing the first plate 64 shown in FIG. 8. It has two kinds of comb electrodes 71 and 73 and the respective kind of electrodes are connected to each other. These electrodes 71 and 73 are connected through respective terminals 75 and 77 to the electric circuit 20'.

Figure 13:
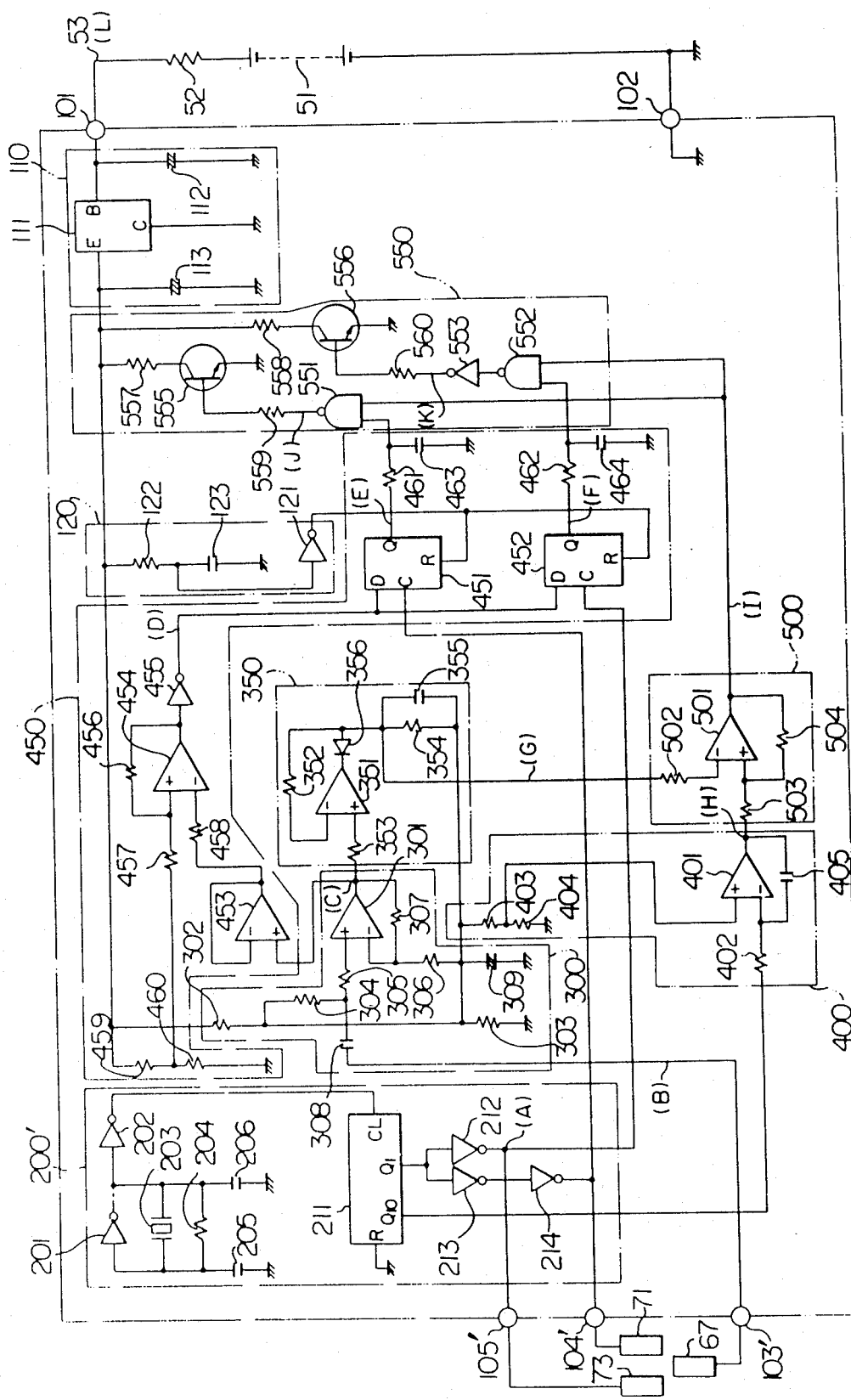
FIG. 13 is a schematic showing an example of the electric circuit used for the embodiment of FIG. 8.

FIG. 13 is an electric circuit diagram for the second embodixent of the torque sensor according to the invention, and voltage waveforms appearing at various parts of the circuitry are such as shown in (A) to (L) of FIG. 6. Namely the construction and operation of the circuitry of FIG. 13 are the same as those having been shown and described in connection with FIG. 5 except that the coupling relation among oscillator 200', input terminals 103' to 105', detecting electrodes 67, 71 and 73, triangular wave generator 400 and left/right discriminating circuit 450 is different from one in the circuitry of FIG. 5. Now, part of the circuitry of FIG. 13 that is different from one in the circuitry of FIG. 5 will be described.

Referring to FIG. 13, a terminal 103' is connected through the portion 70 of the second plate 68 to the comb-shaped second electrode 67. Terminals 104' and 105' are connected through portions 75 and 77 of the first plate 64 to the comb-shaped first electrodes 71 and 73 shown in FIG. 12.

An oscillator 200', which includes an oscillating circuit having inverters 201 and 202, a ceramic oscillator 203, a resistor 204 and capacitors 205 and 206, a binary counter 211 and inverters 212, 213 and 214 in the illustrated connection, generates opposite phase rectangular waves (e.g., one phase wave as shown in (A) of FIG. 6) which are respectively supplied through the terminals 104' and 105' to the first electrodes 71 and 73.

The left/right discriminating circuit 450 discriminates whether a displacement of the second electrode 67 is toward either the first electrode 71 or 73. The current value converting circuit 550 converts signals produced from the left/right discriminating circuit 450 and pulse duration converting circuit 500 into corresponding current value changes. That is, this circuit transmits information about the extent of overlap of the second electrode 67 over either first electrode 71 or 73, in the form of current value changes, to the power supply terminal 101. This information is detected as voltage changes at one end 53 of the resistor 52.

The operation of the construction described above will now be described with reference to (A) to (L) of FIG. 6. A pulse signal generated from the inverter 202 of the oscillator 200' is fed to the C (clock) terminal of the binary counter 211, and a pulse signal as shown in (A) of FIG. 6 is being supplied through the terminal 105' to the first electrode 73. A pulse signal of the opposite phase to the signal of (A) of FIG. 6 is being supplied from the inverters 213 and 214 through the terminal 104' to the first electrode 71.

Figure 14A:
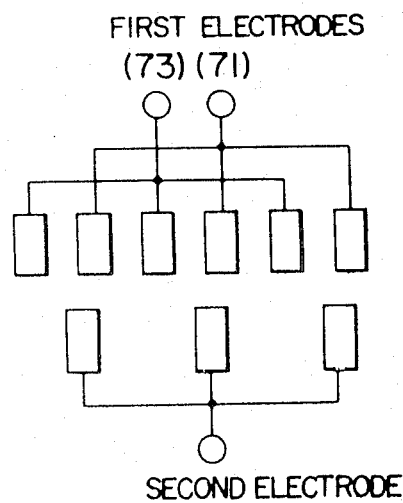
FIGS. 14A to 14C are schematic views showing respective status of the electrodes for illustrating the operation of the second embodiment.

If the second electrode 67 is displaced toward the first electrode 71 as shown in FIG. 14A due to a rightward twist between the first and second rotors 11' and 16' shown in FIG. 8 caused by a certain angle via the torsion spring 35, the overlap area of the second electrode 67 and first electrode 71 is increased. As a result, the electrostatic capacitance between these electrodes becomes larger than the electrostatic capacitance between the second electrode 67 and first electrode 73, whereby a voltage signal corresponding to the twist angle as shown in (B) of FIG. 6 is produced from the second electrode 67 and fed to the capacitor 308 of the amplifier 300.

Meanwhile, the reference voltage from the voltage divider comprised of the resistors 302 and 303 is applied to the other end of the capacitor 308 and is coupled to the non-inverting input terminal of the operational amplifier 301. Since the voltage from the voltage divider comprised of the resistors 302 and 303 is coupled to its inverting input terminal, the operational amplifier 301 amplifies the signal coupled to the capacitor 308 shown in (B) of FIG. 6. The amplified output such as shown in (C) of FIG. 6 is applied to the non-inverting input terminal of the operational amplifier 453 and the subsequent circuit stages effect the similar operation to that of the circuit shown in FIG. 5. Thus the signals such as shown in (D) to (L) of FIG. 6 are generated by the respective circuits, and the pulse signal of (L) of FIG. 6 which has a pulse width corresponding to the twist angle of the torsion spring 35 is generated toward "0" level from a certain voltage level.

Figure 14B:
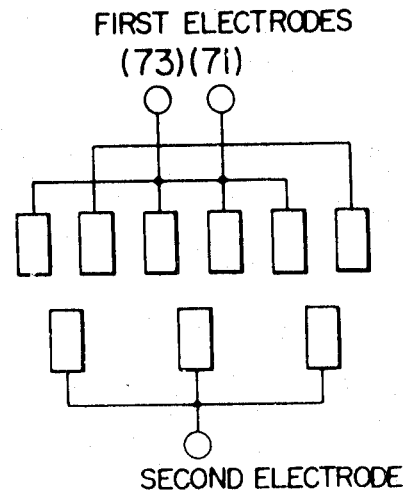

If the twist between the first and second rotors 11' and 16' in FIG. 8 via the torsion spring 35 becomes zero, the second electrode 67 is brought to a position midway between the first electrodes 71 and 73 as shown in FIG. 14B. In this state, the electrostatic capacitance between the second electrode 67 and first electrode 71 is equal to the electrostatic capacitance between the second electrode 67 and first electrode 73. Thus, the voltage at the second electrode 67 is rendered to be "0" level as shown in (B) of FIG. 6. Also, the output voltage of the amplifier 300 becomes equal as shown in (C) of FIG. 6 to the reference voltage of the voltage divider comprised of the resistors 302 and 303. This voltage is supplied to the left/right discriminating circuit 450 and peak hold circuit 350. Similar to the circuit operation in FIG. 5 the signals of intermediate portions shown in (D) to (L) of FIG. 6 are subsequently generated, and the signal of (L) of FIG. 6 indicates that no twist occurs in the spring 35.

Figure 14C:
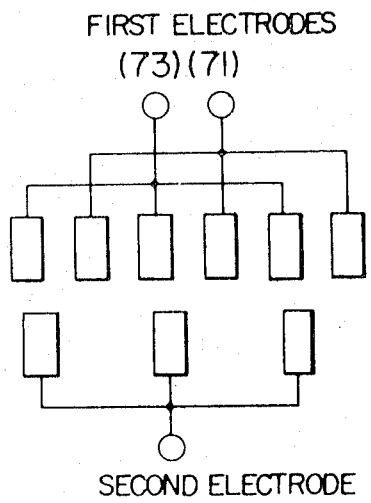

If the second electrode 67 is displaced toward the first electrode 73 as shown in FIG. 14C due to a leftward twist between the first and second rotors 11' and 16' in FIG. 8 caused by a certain angle via the torsion spring 35, the overlap area of the second electrode 67 and first electrode 73 is increased. As a result, the electrostatic capacitance between these electrodes becomes larger than the electrostatic capacitance between the second electrode 67 and first electrode 71. Thus, a signal of the opposite phase to that in case of the rightward twist between the first and second rotors 11' and 16' in FIG. 8 caused via the torsion spring 35 is generated from the second electrode 67 as shown in the right portion of (B) of FIG. 6. It will thus be seen that the same operation as in the case of the afore-mentioned rightward twist except that the phase is opposite takes place (therefore this is not described in detail). Thus, a pulse duration signal corresponding to the angle of twist of the torsion spring 35 is generated, in the direction from the constant voltage level toward "1" level as shown in (L) of FIG. 6, at the end 53 of the current detecting resistor 52.

While the above two embodiments have used a ceramic oscillator element for providing oscillation in the oscillator 200 or 200', the same effects may also be obtained by using an RC oscillating circuit or a crystal oscillator element. Also, while the negative peak voltage has been detected in the peak hold circuit 350, it is also possible to detect the positive peak voltage.

Further, while a triangular wave has been generated using the triangular wave generating circuit 400 for obtaining a pulse signal proportional to the voltage generated in the peak hold circuit 350, it is also possible to use a sawtooth wave. Further, while in the first embodiment a pulse voltage signal is impressed upon the first coil, it is possible to impress a sinusoidal wave.

As has been described in the foregoing, according to the invention changes in the state of electromagnetic or electrostatic coupling between two rotors, which are rotatable relative to each other by detected torque via a torsion bar, are detected for detecting torque, it is possible to provide a torque sensor, which can preclude the drawbacks inherent in the prior art torque sensor suing a semiconductor strain gauge, which is very beneficial in the relevant fields.

I claim:

1. A torque sensor comprising:
a first rotor having two kinds of first electrodes;
a second rotor having a second electrode, said second electrode facing said two kinds of first electrodes at a predetermined distance therefrom and coupled thereto electrically by electrostatic capacitance coupling and mechanically by a torsion spring; and
an electric processing circuit for impressing electric signals of opposite phases to said respective kinds of first electrodes and generating a signal corresponding to the magnitude of twist of said torsion spring from a signal generated from said second electrode according to the magnitude of electrostatic capacitance corresponding to the overlap area of one kind of said first electrodes and said second electrode, said overlap area being variable with the rotation of both said rotors relative to each other caused by said torsion spring,
wherein each kind of said first electrodes are comb-shaped electrodes connected to each other and said second electrode is a comb-shaped electrode the pitch of which is double the pitch of said comb-shaped first electrodes.

2. A torque sensor comprising:
a first rotor having two kinds of first electrodes;
a second rotor having a second electrode, said second electrode facing said two kinds of first electrodes at a predetermined distance therefrom and coupled thereto electrically by electrostatic capacitance coupling and mechanically by a torsion spring; and
an electric processing circuit for impressing electric signals of opposite phases to said respective kinds of first electrodes and generating a signal corresponding to the magnitude of twist of said torsion spring from a signal generated from said second electrode according to the magnitude of electrostatic capacitance coresponding to the overlap area of one kind of said first electrodes and said second electrode, said overlap area being variable with the rotation of both said rotors relative to each other caused by said torsion spring,
wherein said electric processing circuit includes:
an oscillating circuit oscillating at a constant frequency to impress electric signals of opposite phases to said two kinds of first electrodes;
an amplifying circuit for amplifying a signal generated from said second electrode;
a discriminating circuit for discriminating the direction of twist of said torsion spring by comparing signals from said amplifying circuit and from said oscillating circuit; and
a peak hold circuit for detecting the peak of the output voltage from said amplifying circuit and generating a direct current voltage corresponding to the magnitude of twist of said torsion spring.

3. A torque sensor comprising:
a first rotor having two kinds of first electrodes;
a second rotor having a second electrode, said second electrode facing said two kinds of first electrodes at a predetermined distance therefrom and coupled thereto electrically by electrostatic capacitance coupling and mechanically by a torsion spring; and
an electric processing circuit for impressing electric signals of opposite phases to said respective kinds of first electrodes and generating a signal corresponding to the magnitude of twist of said torsion spring from a signal generated from said second electrode according to the magnitude of electrostatic capacitance corresponding to the overlap area of one kind of said first electrodes and said second electrode, said overlap area being variable with the rotation of both said rotors relative to each other caused by said torsion spring,
wherein said oscillating circuit impresses signals of opposite phases one upon one of said two kinds of first electrodes through an inverter and the other upon the other of said first electrodes through two inverters.

4. In a power assisted steering apparatus having torque assisting motor means coupled to a steering main shaft, the torque sensor according to either claim 1 or 3, which further comprises;
means for causing the rotation of one of said first and second rotors according to torque generated in said main shaft; and
means for driving said motor according to the output signal of said electric processing circuit.

5. A torque sensor comprising:
a first rotor having two kinds of first electrodes;
a second rotor having a second electrode, said second electrode facing said two kinds of first electrodes at a predetermined distance therefrom and coupled thereto electrically by electrostatic capacitance coupling and mechanically by a torsion spring; and
an electric processing circuit for impressing electric signals of opposite phases to said respective kinds of first electrodes and generating a signal corresponding to the magnitude of twist of said torsion spring from a signal generated from said second electrode according to the magnitude of electrostatic capacitance corresponding to the overlap area of one kind of said first electrodes and said second electrode, said overlap area being variable with the rotation of both said rotors relative to each other caused by said torsion spring, wherein said electric processing circuit includes:

a triangular wave generated circuit for generating a triangular wave at a constant frequency from the signal from said oscillating circuit;

a pulse duration detecting circuit for generating a signal having a pulse duration proportional to a direct current voltage corresponding to the magnitude of twist of said torsion spring from signals from said triangular wave generator and from said peak hold circuit; and a current converting circuit for generating a current signal, said current signal having one of three current levels corresponding to signals from said left/right discriminating circuit respectively representing leftward twist, no twist and rightward twist of said torsion spring, said current signal having a duration corresponding to a signal from said pulse duration detecting circuit representing the magnitude of twist of said torsion spring;

the output signal of said torque sensor being superimposed upon a power source line.

6. The torque sensor according to claim 5, which further comprises;

means for connecting a power source and ground through brushes to slip rings; and means for permitting free rotation of said first and second rotors with respect to said housing.

* * * * *